United States Patent [19]

Hess

[11] 3,921,754

[45] Nov. 25, 1975

[54] MUFFLER HAVING A CONNECTION BETWEEN ITS DISKS AND THE TUBE LENGTHS EXTENDING THERETHROUGH

[76] Inventor: Rainer Hess, Vorderlohweg 21, 7602 Oberkirch, Germany

[22] Filed: Mar. 26, 1974

[21] Appl. No.: 455,034

[30] Foreign Application Priority Data
Mar. 29, 1973 Germany............................ 7336778
May 11, 1973 Germany............................ 2323951

[52] U.S. Cl............. 181/35 R; 29/157 R; 181/35 C
[51] Int. Cl.²............................................. F01N 1/00
[58] Field of Search............ 181/35 C, 68, 69, 35 R; 29/157 R, 157.3 A, 157.4

[56] References Cited
UNITED STATES PATENTS
1,735,789  11/1929  Powell...................... 181/35 C UX FOREIGN PATENTS OR APPLICATIONS
1,119,559  7/1968  United Kingdom............... 181/35 C Primary Examiner—Joseph W. Hartary
Assistant Examiner—John F. Gonzales
Attorney, Agent, or Firm—Burns, Doane, Swecker & Mathis

[57] ABSTRACT

The invention relates to a muffler consisting of an external tube housing, pressed intermediate and terminal disks, and exhaust tubes for the exhaust gases extending through and connected to at least the terminal disks. The disks and tubes are each connected together by a gas-tight seal which includes a pair of beads bent around a disk flange into tight engagement with opposite disk sides. The beads are defined by outwardly folded portions of the tube and are disposed between tubular-shaped portions of the tube.

8 Claims, 9 Drawing Figures

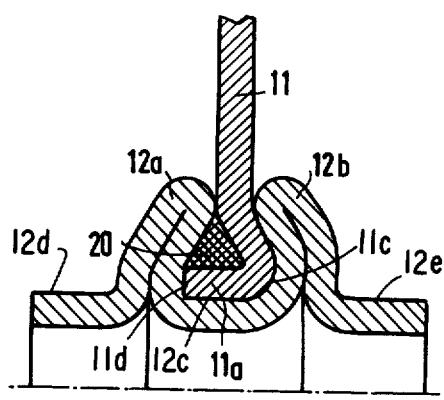
FIG. 3
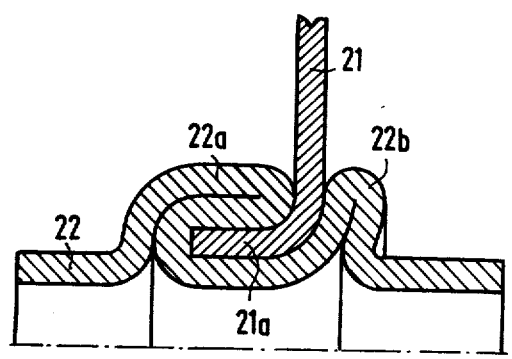
FIG. 4
FIG. 6
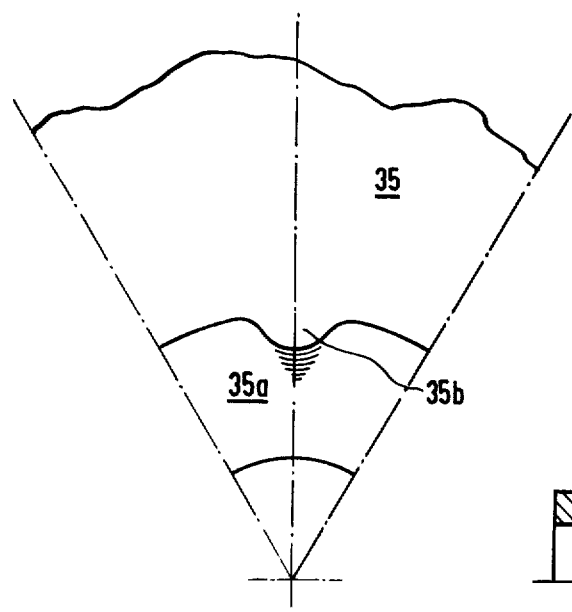
FIG. 5
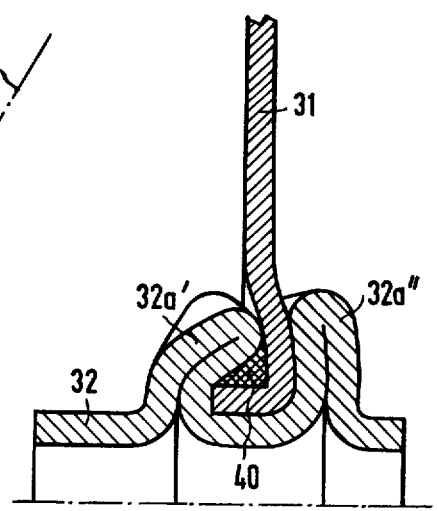

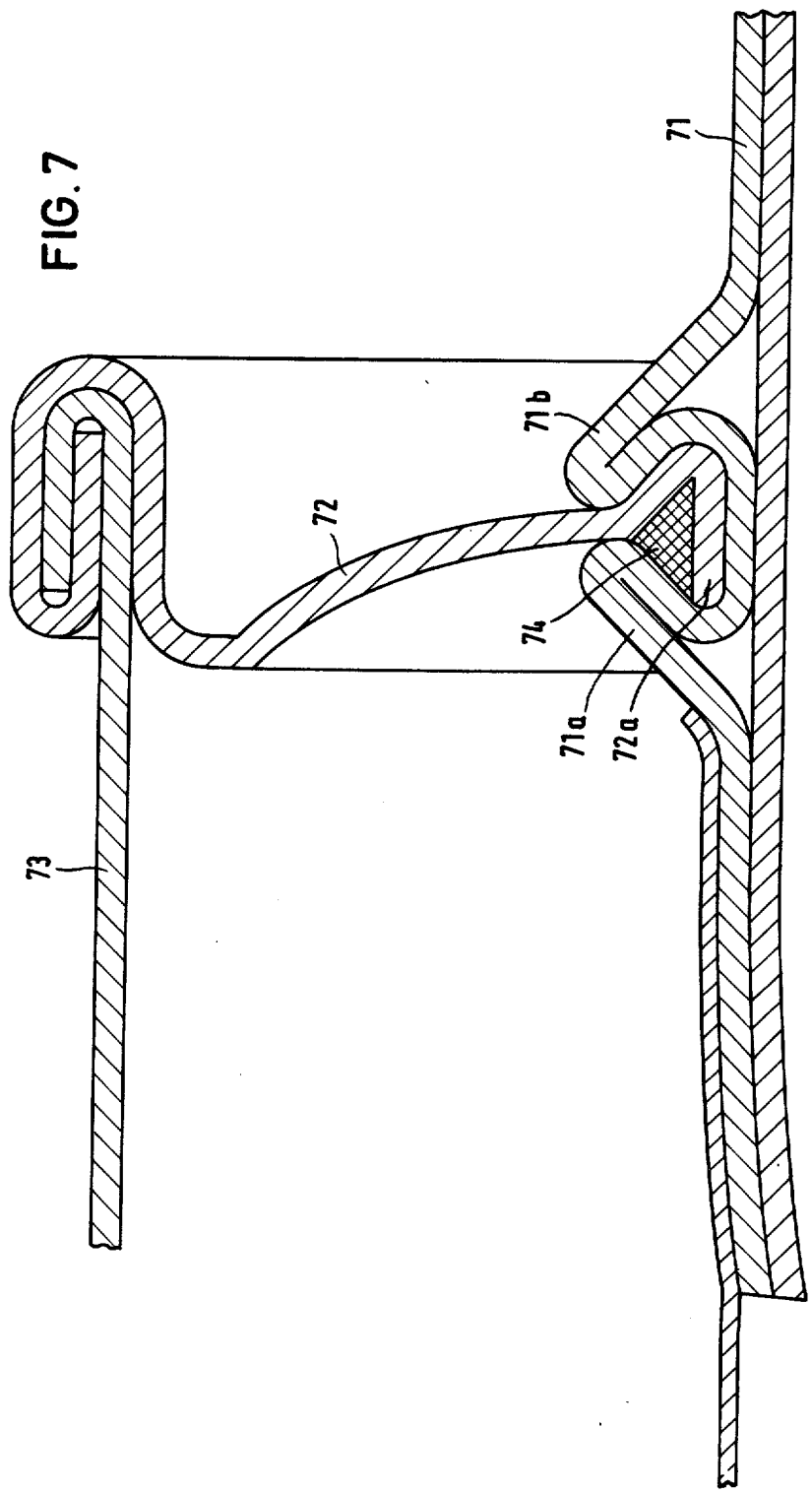

MUFFLER HAVING A CONNECTION BETWEEN ITS DISKS AND THE TUBE LENGTHS EXTENDING THERETHROUGH

An automobile muffler substantially consists of tubes and pressed intermediate and terminal disks. These two structural elements are mostly welded together, and the heat which the material must withstand during welding as well as the material of the welding seams themselves create sites which are particularly prone to the attack by water and corrosive gases which frequently result in premature breakage and in the destruction of the muffler. Moreover, the investment of labor in the manufacture of the welded joints between the disks and the tubes is relatively high, so that the costs of a muffler and the time required for its production are unfavorably influenced.

Therefore, it is the object of the invention to design a muffler consisting of a tubular housing, intermediate and terminal disks, and inlet and exhaust tubes such that the tubes leading through the disks are free from vibration and otherwise tight over their entire service lifetime, without having to be welded, it being desirable that the connection is free from welding seams and thus especially simply established without affecting the material and without the use of heat.

This object is reached in that the apertures in the disks through which the tubes extend are provided with a flanged rim standing substantially perpendicular on the disk plane and being surrounded on both sides by one upset or folded bead each of the tube forced outwardly and pressed against the disk faces.

The production method of the invention is realized such that the disk is threaded on the tube length and pushed up to its final position, the said tube length being dimensioned so as to allow for the material required for the upset beads on both sides of the disk, and thereafter the tube length is stressed by axial thrust forces above the point of its plastic deformation, while being held on a rigid sliding support along its entire inner surface, and the tube sections on either side of the disk not needed for the bead formation are rigidly held also around their outer surface until the beads forming from the tube length are urged against the disk.

Moreover, the invention is concerned with an apparatus for carrying out the above described method which is characterized by a mandrel tightly filling the inner space of the tube length; rigid, snugly fitting sleeves which can be placed on the tube sections to be surrounded from the outside; abutments bearing against the front tube edges substantially around their entire circumference, at least one of them being designed as a ring shiftable along the mandrel; and a pressing device forcing the abutments towards each other.

Hence, the individual parts are pre-fabricated, as conventional in the manufacture of mufflers; yet, the tube lengths are cut to a size exceeding their final length. Since the tube is held from all sides except for the regions directly adjacent the disk, it can bulge out only in these regions to form annular beads which are urged against the disk. The cross sectional configuration of the tube is of secondary significance. Moreover, the tube need not necessarily be pressed at right angles with respect to the disk.

It is advantageous to make the externally uncovered tube sections on either side of the disk of different length, if differently high beads are desired, especially in view of the flanged rim surrounding the aperture at the site where the tube extends through the disk, which flanged rim prevents, in turn, the tube from bulging outwardly at this point during upsetting. The tight bending of the beads around the edges of the flanged rim seals the area where the tube extends through the disk tightly and free of vibration, since the material of the flanged rim can be yieldingly deformed.

For further improvement of the seal a plastically deformable sealing strip may be placed into the fold of the flanged rim which may be an asbestos strip, a lead or copper ribbon, or the like.

Aside from the fact that pressing per se already produces a seat substantially safe against relative rotation, an absolute safety against rotation may be provided by at least one nose in a conical enlargement of the one sleeve of the pressing device and by recesses matching in size, shape, alignment and number in the face of the conical enlargement of the second sleeve, whereby beads and disk are non-uniformly squeezed together.

The drawing shows in a schematically simplified way a device by means of which the method of the invention can be carried out, and examples of various connections between disks and tubes of mufflers produced with the method of the invention. In detail, the drawing shows in FIG. 1 a schematically simplified cross section through the device for joining a disk to a tube length according to the invention;

FIG. 3 is an enlarged section through a connection made according to the invention between disk and tube length;

FIG. 4 is another connection between disk and tube length;

FIG. 5 is still another embodiment of the connection in section;

FIG. 6 is a plan view on the pressing front end of the sleeve with a means safeguarding the parts against rotation after pressing;

FIG. 7 is an enlarged section of another connection embodiment.

Figure 1:
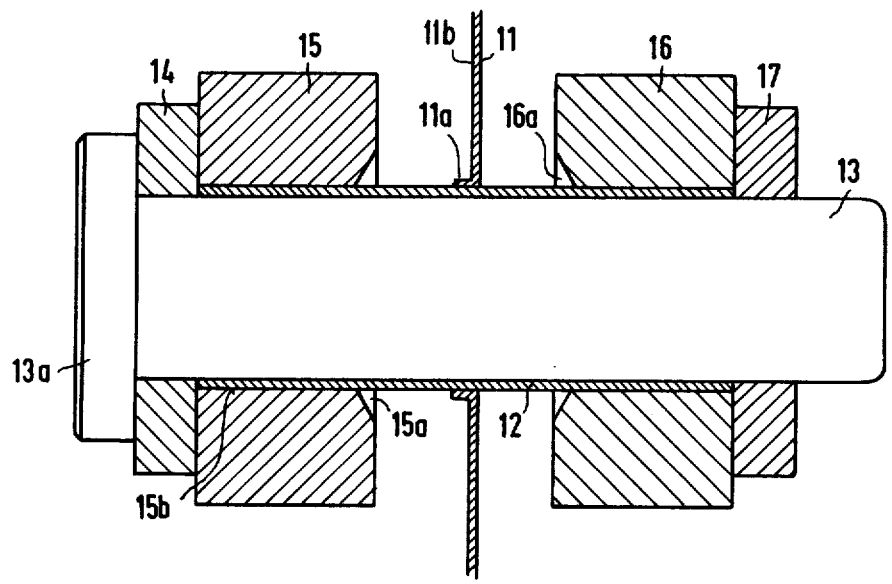

In a schematically simplified form FIG. 1 shows an apparatus for producing the connection between a substantially planar disk 11 and a tube length 12 extending therethrough. The disk 11 is placed on the tube length and pushed up to its final position which it is to assume on the tube length 12 in pressed condition. In the present case a planar disk which includes a main body portion 11b and a flanged rim 11a is shown which flange surrounds a circular aperture through which the cylindrical tube 12 is passed. The flange has an inner end 11c and an outer free end 11d. The cylindrical tube 12 has a length in excess of that required for the desired final state after connection with the disk which allows for the material required to form the folded beads on either side of the disk 11 in the manner which will be described in more detail below.

On a mandrel 13 having a head 13a on one end a pressure ring 14 which is not obligatory is moved up to the head 13a. The pressure ring has a round bore whose inner diameter corresponds to the outer diameter of the mandrel 13. The mandrel itself has an outer diameter such that it will snugly fit into the tube length 12.

When the tube length is not cylindrical as in the illustrated embodiment, the cross section for the mandrel 13 will be selected such that it corresponds to the internal cross section of the tube length 12.

After the pressure ring 14 the tube length 12 is pushed over the mandrel 13, after previously a snugly fitting sleeve 15 has been placed over the end of the tube length 12 near the pressure ring 14, which sleeve tightly surrounds the outer surface of the tube length 12 along the entire length of the tube section that is to remain cylindrical. Depending on the length of the tube extending beyond the disk 11, the sleeve 15 must be longer or shorter; of course, it is also possible to provide a series of sleeves 15.

At the front face facing the disk 11 the sleeve 15 has a conically tapered portion 15a of its bore 15b which accommodates a portion of the folded bead of the tube length to be formed later. The taper of the conical portion may be adapted to requirements which will be described separately in connection with FIGS. 3 to 5.

Onto the other end of the tube length 12 which is positioned near the free end of the mandrel 13 a substantially identical sleeve 16 with tapered portion 16a in the front face facing the disk 11 is placed until it is flush with the free rim of the tube length 12. A second pressure ring 17 is finally placed on the mandrel 13 against the free rim of the tube length 12.

Figure 2:
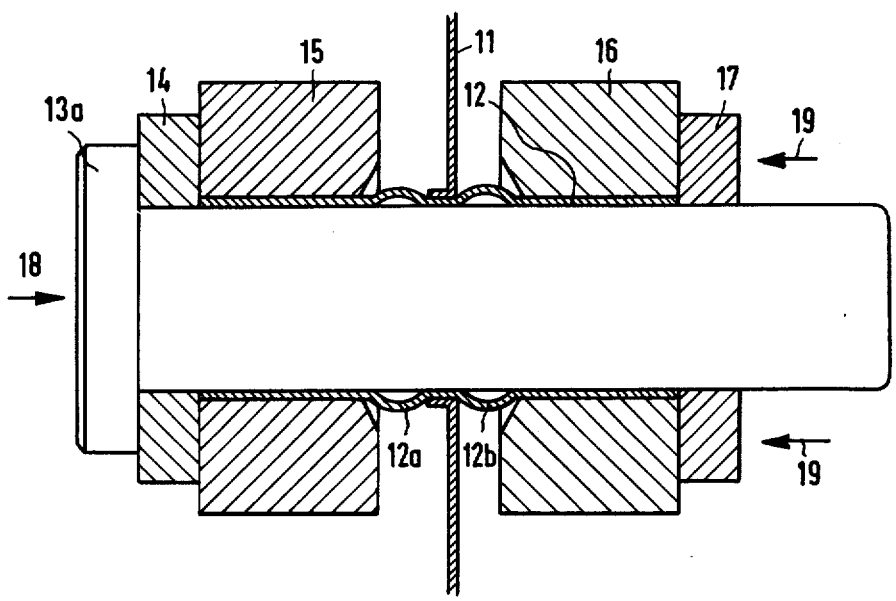
FIG. 2 shows the same arrangement in an advanced stage of operation.

In FIG. 2 the arrangement just described in connection with FIG. 1 is illustrated once more; however, in the directions indicated by arrows 18, 19 axial force is exerted on the mandrel head 13a and on the pressure rings 14, 17, respectively, whereby the region of the tube length not held on the outside by the sleeves 15, 16 may bulge outwardly and the total length of the tube can be reduced. Beads 12a are formed which rise higher with increasing compression of the tube until finally they are pressed against the disk 11 by the base surfaces of the conically tapered portions.

A folding connection of the type which can be produced with the just described apparatus is illustrated by FIG. 3. The disk 11 with its flanged rim 11a is snugly surrounded by the folded beads 12a which are symmetrical on account of the equal configuration of the conically tapered portions 15a, 16a in the two rings 15, 16 whereby the disk 11 was slightly deformed. The flange 11a engages a tubular segment 12c of the tube. On either side of the beads 12a, 12b tubular-shaped portions 12d, 12e extend. In the embodiment of FIG. 3 a sealing ring 20 of plastically deformable material, e.g. asbestos cord, is placed in the flanged rim. This ensures absolute tightness of the connection.

FIG. 4 shows a slightly modified connection in which a disk 21 is also held by two folded beads 22a and 22b of the tube length 22. The enlargements of the bore in the sleeves, however, are different in this case. Possibly the sleeve on the right hand side did not have any enlargement at all, while the left hand side sleeve had a cylindrical, rather than a conical, enlargement, in order to fold the beaded rim 22a at right angles about the flanged rim 21a.

FIG. 5 shows a section through a connection between tube length 32 and disk 31 which is caused by a nose 35b within the conical enlargement 35a of the sleeve 35 which otherwise is identical with the sleeve 15, and a matching recess (not shown) in the corresponding opposite sleeve in locally closely confined regions around the periphery. By the nose 35b at this point the beaded rim 32a' on the left hand side of the disk is bent over farther, and the disk is slightly depressed, while the beaded rim 32'' on the right hand side of the disk 31 is bent less at this point which coincides with the center line through the illustration of FIG. 6. Also in this connection a sealing ring 40 is provided. Disk 31 and tube length 32 cannot rotate relative to each other.

FIG. 6 shows a section through the sleeve 35 described already in connection with FIG. 5, seen from the disk.

FIG. 7 shows that also disks 72 shaped in cup form to reduce vibrations may be connected to a tube length 71 in the same way. It is only necessary that at least on one side the sleeve conforms with the disk shape. Moreover, the disk is connected by a flanged rim to an outer tube 73 in the conventional manner. In the fold of the flanged rim 72a of the disk 72 a seal 74 is inserted. The upset beads 71a and 71b are urged obliquely and firmly against the disk 72 in the manner described before.

With the invention the general phenomenon is utilized that an axially stressed tube length supported on its interior and held in certain regions of its exterior shows the tendency of evading in the form of annular beads, depending on the material, the tube wall thickness, and the tube diameter, said annular beads forming very uniformly, provided the tube section not held from the outside is sufficiently long.

Figure 8:
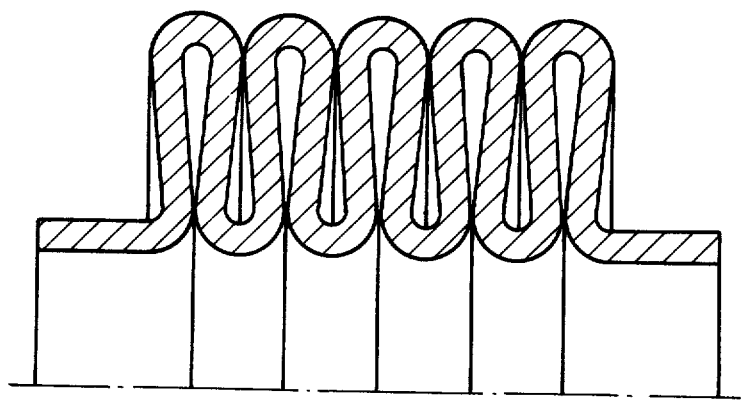
FIG. 8 is a fluted tube with a greater number of flutes produced by simple upsetting.
Figure 9:
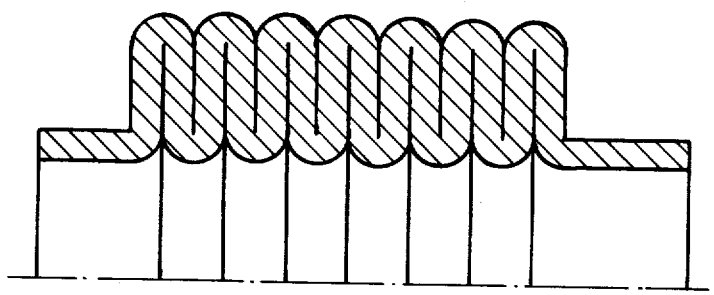
FIG. 9 is another fluted tube produced by upsetting.

FIGS. 8 and 9 show two such folded tubes; the two different tubes differ by the quality of the material, thicknesses of the tube walls, or tube diameters, or by several of these properties. When such folded tubes are to be produced, their ends and their interior are supported by sleeves and a guide mandrel, respectively, and the free outer region is selected such that the desired number of folds can be formed. The outer diameter of the folds need not necessarily be confined by a further tube. The above listed properties of the tube automatically result in one fold after the other as the tube is forced together in axial direction. In the formation of the folded tube shown in FIG. 9 the sleeves (not shown) were moved toward each other so far that the spaces disappeared which remained between the folds during their formation and which are visible in FIG. 8.

The advantages resulting from this construction of mufflers may be summarized as follows:
1. low costs of material;
2. assembly in one operational step;
3. the parts are absolutely safe against relative rotation;
4. the material resists corrosion as it has not been treated in the heat;
5. shorter assembling time;
6. the possibility of joining different materials that cannot be welded together.

I claim:
1. In a muffler comprising an outer housing, a pair of apertured disks mounted at inlet and outlet ends of said housing, and a pair of inlet and outlet tubes extending through the apertures of said disks; the improvement wherein:
said disks each include:
a main body portion, and
an aperture-defining flange having an inner end integral
with said main body portion, and an outer free end; said flange extending substantially perpendicularly relative to said main body portion from said inner end to said outer end, and being in engagement with a tubular-shaped segment of a respective tube; and said tubes each comprising:
   first and second tubular-shaped portions extending away from opposite sides of said disk, and
   a pair of beads defined by outwardly folded sections of said tube located between said first and second tubular-shaped portions, the beads being situated at opposite sides of said tubular-shaped segment and extending completely around opposite ends of said disk aperture;
   one of said beads being bent about said inner flange end and being seated tightly against one side of said disk, and the other bead being bent about said outer flange end and being seated tightly against the other side of said disk, to establish a gas-tight connection between said tube and said disk.

2. Apparatus according to claim 1 wherein said disk includes a sealing ring of deformable material extending around said flange; and said other bead being seated tightly against said sealing element.

3. Apparatus according to claim 1 wherein said main body portion of said disk and said tube are disposed relative to each other at an angle other than 90°.

4. Apparatus according to claim 1 wherein said other bead includes an outer portion folded atop an outer face of said flange.

5. Apparatus according to claim 1 wherein said pair of beads are of different radial dimensions.

6. Apparatus according to claim 1 wherein one of said beads includes a nose which projects into a depression of said disk to retard relative rotation between said disk and said tube.

7. Apparatus according to claim 2 wherein said inner flange end is displaced from the plane of said main body portion in a direction away from said other bead to define a groove; said sealing ring being seated in said groove.

8. Apparatus according to claim 2 wherein said other bead includes an outer portion folded atop an outer face of said flange.

* * * * *